US012180332B2

United States Patent
Liao et al.

(10) Patent No.: US 12,180,332 B2
(45) Date of Patent: Dec. 31, 2024

(54) METHOD FOR PRODUCING PLASTICIZER

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Che-Jung Hsu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 311 days.

(21) Appl. No.: 17/377,531

(22) Filed: Jul. 16, 2021

(65) Prior Publication Data

US 2022/0056203 A1 Feb. 24, 2022

(30) Foreign Application Priority Data

Aug. 20, 2020 (TW) ................. 109128344

(51) Int. Cl.
*C08G 63/20* (2006.01)
*C08G 63/85* (2006.01)

(52) U.S. Cl.
CPC ............. *C08G 63/20* (2013.01); *C08G 63/85* (2013.01)

(58) Field of Classification Search
CPC ........ C08G 63/20; C08G 63/21; C08G 63/85; C08G 63/78; C08L 67/02
See application file for complete search history.

(56) References Cited

U.S. PATENT DOCUMENTS

| | | | | |
|---|---|---|---|---|
| 4,122,057 A | * | 10/1978 | Lamont | C08L 27/06 524/569 |
| 4,253,665 A | * | 3/1981 | Miller, Jr. | A63B 37/14 524/321 |
| 5,364,956 A | * | 11/1994 | Matsumoto | C07C 69/44 560/198 |

FOREIGN PATENT DOCUMENTS

| | | | |
|---|---|---|---|
| CN | 102731755 A | | 10/2012 |
| CN | 103819659 A | | 5/2014 |
| CN | 108774313 | * | 11/2018 |
| JP | 8120063 A | | 5/1996 |
| JP | H08120063 | * | 5/1996 |
| JP | 5230200 A | | 9/1996 |
| JP | 201292074 A | | 5/2012 |
| JP | 2012092074 | * | 5/2012 |

OTHER PUBLICATIONS

T.C.Ward " Molecular Weight and Molecular Weight Distributions in Synthetic Polymers", Journal of Chemical Education, vol. 58 No. 11 Nov. 1981. (Year: 1981).*
"Carothers equation", Wikipedia, retrieved on Jan. 24, 2024 (Year: 2024).*

* cited by examiner

*Primary Examiner* — Frances Tischler
*Assistant Examiner* — Gennadiy Mesh
(74) *Attorney, Agent, or Firm* — Li & Cai Intellectual Property (USA) Office

(57) ABSTRACT

A plasticizer and a method for producing the same are provided. The method for producing the plasticizer includes: reacting a reaction mixture at each of a plurality of temperature holding stages in a heating process to form a semi-finished product; and purifying the semi-finished product at each of a plurality of low pressure stages of a decompression process to obtain a plasticizer. A temperature range of the heating process is from 140° C. to 220° C., a pressure range of the decompression process is from 750 Torr to 20 Torr, and the reaction mixture contains dibasic acid (e.g., adipic acid), diol (e.g. 1,4-butanediol), monohydric alcohol (e.g., 2-ethylhexanol), and catalyst (e.g., titanium catalyst).

10 Claims, 2 Drawing Sheets

METHOD FOR PRODUCING PLASTICIZER

CROSS-REFERENCE TO RELATED PATENT APPLICATION

This application claims the benefit of priority to Taiwan Patent Application No. 109128344, filed on Aug. 20, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a plasticizer and a method for producing the same, and more particularly to a plasticizer that does not contain benzene and a method for producing the same.

BACKGROUND OF THE DISCLOSURE

During a manufacturing process of plastic products, plasticizers are added into raw materials to liquify materials or allow a texture of the materials to be softer and more flexible. Phthalate (PAEs) compounds are the most widely used plasticizers in current applications. However, the safety of phthalate compounds after long term use has been constantly questioned.

In 2008, the European Chemicals Agency (ECHA) listed phthalate compounds in a candidate list of substances of very high concern (SVHC), which includes dibutyl phthalate (DBP), bis(2-ethylhexyl) phthalate (DEHP), and benzyl butyl phthalate (BBP). In addition, the candidate list of SVHC is updated periodically. In other words, a number of phthalate compounds included in the candidate list of SVHC will continue to increase over time.

According to content in the Registration, Evaluation, Authorization and Restriction of Chemicals (REACH), when a product contains 1000 ppm (weight percentage) of SVHC, a provider is obliged to inform a consumer of the information, and the consumer can request an importer to provide related information within 45 days. In addition, when a total content of SVHC of a product is greater than one ton, the importer is required to obtain authorization from the ECHA before importing and selling the commodity into the European market.

Restrictions toward phthalate compounds in various countries are not simply limited to the abovementioned dibutyl phthalate, bis(2-ethylhexyl) phthalate, and benzyl butyl phthalate, but rather covers almost all types of phthalates. Therefore, a non-phthalate plasticizer is urgently needed in the market to overcome safety concerns associated with conventional plasticizers.

SUMMARY OF THE DISCLOSURE

In response to the above-referenced technical inadequacy, the present disclosure provides a plasticizer and a method for producing the same.

In one aspect, the present disclosure provides a plasticizer and a method for producing the same. The method for producing the plasticizer includes the following steps of: reacting a reaction mixture at each of a plurality of temperature holding stages in a heating process to form a semi-finished product; and purifying the semi-finished product at each of a plurality of low pressure stages of a decompression process to obtain a plasticizer. A temperature range of the heating process is from 140° C. to 220° C., a pressure range of the decompression process is from 750 Torr to 20 Torr, and the reaction mixture contains dibasic acid, diol, monohydric alcohol, and catalyst.

In certain embodiments, the temperature holding stages are respectively a first temperature holding stage, a second temperature holding stage, a third temperature holding stage, and a fourth temperature holding stage. A temperature of the first temperature holding stage is from 140° C. to 155° C., a temperature of the second temperature holding stage is greater than 155° C. and up to 170° C., a temperature of the third temperature holding stage is greater than 170° C. and up to 190° C., and a temperature of the fourth holding stage is greater than 190° C. and up to 220° C.

In certain embodiments, a duration time of each of the first temperature holding stage, the second temperature holding stage, the third temperature holding stage, and the fourth temperature holding stage is from 0.5 hours to 4 hours.

In certain embodiments, the heating process of each of the temperature holding stages is completed at a temperature rising rate from 3° C./hour to 12° C./hour.

In certain embodiments, an overall average temperature rising rate of the heating process is from 4° C./hour to 8° C./hour.

In certain embodiments, when an acid value of the semi-finished product is from 15 mg KOH/g to 20 mg KOH/g, the heating process is completed.

In certain embodiments, when an acid value of the semi-finished product is from 5 mg KOH/g to 10 mg KOH/g, the decompression process is initiated.

In certain embodiments, the low pressure stages are respectively a first low pressure stage, a second low pressure stage, a third low pressure stage, and a fourth low pressure stage. A pressure of the first low pressure stage is from 750 Torr to 400 Torr, a pressure of the second low pressure stage is less than 400 Torr and as low as 300 Torr, a pressure of the third low pressure stage is less than 300 Torr and as low as 150 Torr, and a pressure of the fourth low pressure stage is less than 150 Torr and as low as 20 Torr.

In certain embodiments, a duration time of each of the first low pressure stage, the second low pressure stage, the third low pressure stage, and the fourth low pressure stage is from 0.5 hours to 3 hours.

In certain embodiments, the decompression process of each of the low pressure stages is completed at a decompression rate of from 75 Torr/hour to 175 Torr/hour.

In certain embodiments, an overall average decompression rate of the decompression process is from 75 Torr/hour to 125 Torr/hour.

In certain embodiments, in a reaction compound, a molar ratio of dibasic acid to diol to monohydric alcohol is 1:0.83 to 0.99:0.32 to 0.47.

In certain embodiments, the method for producing the plasticizer further comprises: putting dibasic acid, diol, and catalyst into a chemical reactor, then adding in monohydric alcohol during the heating process, so as to form the reaction mixture.

In another aspect, the present disclosure provides a plasticizer, in which the plasticizer is produced by the method as mentioned previously. The plasticizer is an aliphatic polyester, and an Alpha (a) value of a hue of the plasticizer is 0 to 50.

Therefore, one of the beneficial effects of the present disclosure is that, in the plasticizer and the method for producing the same provided herein, by virtue of "the reaction mixture containing dibasic acid, diol, monohydric alcohol, and catalyst", the aliphatic polyester plasticizer can be obtained to replace conventional phthalate plasticizers.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
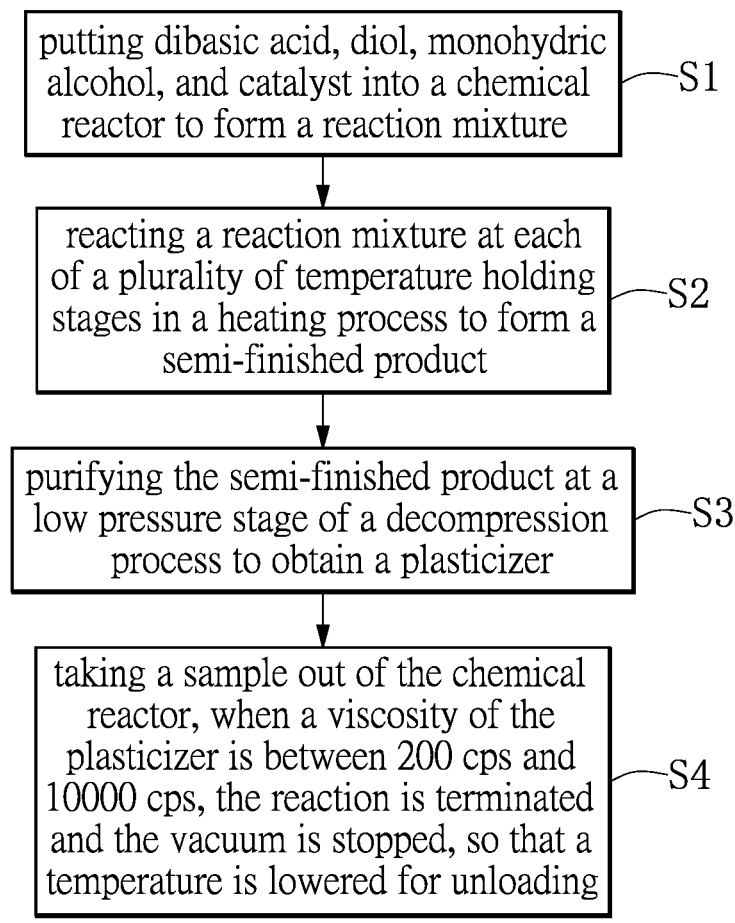
FIG. 1 is a flowchart of a method for producing a plasticizer according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a plasticizer and a method for producing the same. The plasticizer of the present disclosure is an aliphatic polyester, and does not belong to phthalate esters. A structure of the plasticizer does not contain benzene, which means that the plasticizer should have no safety concerns. Therefore, the plasticizer of the present disclosure can replace the conventional phthalate plasticizer, and the plasticizer of the present disclosure also has an advantage of having good color and an Alpha (a) value from 0 to 50.

The method for producing the plasticizer includes a heating process having a plurality of temperature holding stages and a decompression process having a plurality of low pressure stages. After a reaction mixture undergoes the temperature holding stages, a semi-finished product is formed. Next, after the semi-finished product undergoes the low pressure stages, the plasticizer of the present disclosure can be obtained.

The method of producing the plasticizer of the present disclosure will be described in detail below. In step S1, dibasic acid, diol, monohydric alcohol, and catalyst are put into a chemical reactor to form the reaction mixture, and a temperature of a reaction tank of the chemical reactor is set to 150° C. with an atmospheric pressure. The dibasic acid can be an aliphatic saturated dicarboxylic acid with a carbon number of 4 to 12. The diol can be a branched aliphatic saturated diol with a carbon number of 2 to 10, or a straight chain aliphatic saturated diol with a carbon number of 2 to 10. The monohydric alcohol can be an aliphatic saturated monohydric alcohol with a carbon number of 4 to 14. The catalyst can be a titanium catalyst, a tin catalyst, a sodium catalyst, a zinc catalyst, or a magnesium catalyst.

More specifically, the dibasic acid is selected from a group consisting of succinic acid, glutaric acid, adipic acid, pimelic acid, suberic acid, azelaic acid, sebacic acid, and dodecanedioic acid, and the dibasic acid is preferably adipic acid. The diol is selected from a group consisting of ethylene glycol, polyethylene glycol, propylene glycol, polypropylene glycol, 2-methyl-1,3-propanediol, 1,3-dimethylpropanediol, 1,3-butanediol, 1,4-butanediol, neopentyl glycol, 1,6-hexanediol, and 1,10-decanediol, and the diol is preferably 2-methyl-1,3-propanediol or a combination thereof. The monohydric alcohol is selected from a group consisting of 2-propylheptanol, isobutanol, n-butanol, pentanol, n-hexanol, 2-ethylhexanol, isooctyl alcohol, n-octanol, and n-decyl alcohol, and the monohydric alcohol is preferably 2-ethylhexanol, 2-propylheptanol or a combination thereof. The catalyst is selected from a group consisting of titanate, stannous oxide, stannous oxalate, sodium aluminate, titanium oxide, zinc oxide, and magnesium oxide, and the catalyst is preferably titanate.

It is worth noting that in certain embodiments, in step S1, the dibasic acid, the diol, and the catalyst can be first put into the chemical reactor to form the reaction mixture. The monohydric alcohol can then be added into the chemical reactor during step S2 (that is, the heating process).

In step S2, the reaction mixture is reacted at the temperature holding stages in the heating process to form the semi-finished product. In the heating process, water produced by an esterification reaction can be removed at a high temperature (greater than 100° C.) to achieve an effect of removing moisture.

A temperature range of the heating process can be any range covered between 140° C. and 220° C. In this embodiment, the temperature range of the heating process is from 150° C. to 200° C. A plurality of predetermined temperature values are respectively selected from the temperature range of the heating process as temperatures of the temperature holding stages. In some embodiments, the predetermined temperature values can include upper and lower limits of the temperature range, but it is not limited thereto. In other words, the upper and lower limits of the temperature range can also not be included in the predetermined temperature values. A number of the predetermined temperature values can be greater than or equal to 3, and the number of the predetermined temperature values is preferably greater than or equal to 4.

For example, when the temperature range is from 150° C. to 200° C., the predetermined temperature values can be any value from 150° C. to 200° C., such as, but not limited to: 155° C., 160° C., 165° C., 170° C., 175° C., 180° C., 185° C., 190° C. or 195° C., or can selectively be 150° C. or 200° C. (the upper and lower limits).

The present embodiment regulates the temperature of each of the temperature holding stages, in order to control a reaction rate of the reaction mixture. In the present embodiment, the temperature holding stages in the heating process are sequentially performed from a low temperature to a high temperature, which are respectively a first temperature holding stage, a second temperature holding stage, a third temperature holding stage, and a fourth temperature holding stage. A temperature of the first temperature holding stage is from 140° C. to 155° C., a temperature of the second temperature holding stage is greater than 155° C. and up to 170° C., a temperature of the third temperature holding stage is greater than 170° C. and up to 190° C., and a temperature of the fourth holding stage is greater than 190° C. and up to 220° C. A duration time of each of the first temperature holding stage, the second temperature holding stage, the third temperature holding stage, and the fourth temperature holding stage is from 0.5 hours to 4 hours.

In the heating process, the duration time of the temperature holding stages can be adjusted according to the number of the predetermined temperature values or a difference between the predetermined temperature values. More specifically, when the number of the predetermined temperature values is large, the duration time of each of the temperature holding stages can be reduced, and conversely, when the number of the predetermined temperature values is small, the duration time of each of the temperature holding stages can be extended. When the difference between the predetermined temperature values is large, the duration time of each of the temperature holding stages can be extended, and conversely, when the difference between the predetermined temperature values is small, the duration time of each of the temperature holding stages can be reduced.

A temperature rising rate of each of the temperature holding stages is preferably 0° C./hour to 12° C./hour. In an overall view of the entire heating process, an average temperature rising rate of the reaction mixture ranges from 4° C./hour to 8° C./hour.

In the heating process, a reactant can fully react and polymerize to avoid producing low molecular weight polymers with incomplete polymerization. The production of low molecular weight polymers will negatively affect a uniformity of viscosity of a final product and cause an issue of uneven quality of plasticizers. Moreover, when plasticizers are used, the low molecular weight polymers in the plasticizers may ooze out during a processing program, which causes an issue of poor processability.

If the reaction mixture is heated in a continuous heating manner (i.e., the temperature of the chemical reactor changes with time), the monohydric alcohol will most likely react with the dibasic acid in the beginning, so that an acid group at the end of the dibasic acid is substituted. Then, the polymerization reaction between the monohydric alcohol and the dibasic acid cannot be continued, which results in the production of the low molecular weight polymer.

In a preferred embodiment, when an acid value of the semi-finished product is from 15 mg KOH/g to 20 mg KOH/g, the heating process is completed (step S2).

In a preferred embodiment, when an acid value of the semi-finished product is from 5 mg KOH/g to 10 mg KOH/g, the decompression process is initiated (step S3).

In step S3, the semi-finished product is respectively purified at the low pressure stages of the decompression process to obtain the plasticizer. In the decompression process, low boilers (i.e., low molecular weight polymers) produced during the polymerization reaction can be removed, so as to maintain the uniformity of viscosity of the plasticizer. In this way, the plasticizer of the present disclosure can have advantages of good processability, low odor, and good color.

The pressure range of the decompression process can be any range covered between 750 Torr and 20 Torr. In this embodiment, the pressure range of the decompression process is from 500 Torr to 100 Torr. A plurality of predetermined pressure values are respectively selected from the pressure range of the decompression process as the pressures of the low pressure stages. In some embodiments, the predetermined pressure values can include upper and lower limits of the pressure range, but are not limited thereto. In other words, the upper and lower limits of the pressure range can also not be included in the predetermined pressure values. A number of the predetermined pressure values can be greater than or equal to 3, and the number of the predetermined pressure values can preferably be greater than or equal to 4.

For example, when the pressure range is from 500 Torr to 100 Torr, the predetermined pressure values can be any value from 500 Torr to 100 Torr, such as, but not limited to: 450 Torr, 400 Torr, 350 Torr, 300 Torr, 250 Torr, 200 Torr or 150 Torr, or can selectively be 500 Torr or 100 Torr (the upper and lower limits).

The present embodiment regulates the pressure of each of the low pressure stages, in order to control a purification effect of the semi-finished product. In the present embodiment, the low pressure stages in the decompression process are sequentially performed from a high pressure to a low pressure, which are respectively a first low pressure stage, a second low pressure stage, a third low pressure stage, and a fourth low pressure stage. A pressure of the first low pressure stage is from 750 Torr to 400 Torr, a pressure of the second low pressure stage is less than 400 Torr and as low as 300 Torr, a pressure of the third low pressure stage is less than 300 Torr and as low as 150 Torr, and a pressure of the fourth low pressure stage is less than 150 Torr and as low as 20 Torr. A duration time of each of the first low pressure stage, the second low pressure stage, the third low pressure stage, and the fourth low pressure stage is from 0.5 hour to 3 hours.

In the decompression process, the duration time of the low pressure stages can be adjusted according to the number of the predetermined pressure values or a difference between the predetermined pressure values. More specifically, when the number of predetermined pressure values is large, the duration time of each of the low pressure stages can be reduced, and conversely, when the number of the predetermined pressure values is small, the duration time of each of the low pressure stages can be extended. When the difference between the predetermined pressure values is large, the duration time of each of the low pressure stages can be extended, and conversely, when the difference between the predetermined pressure values is small, the duration time of each of the low pressure stages can be reduced.

A decompression rate of each of the low pressure stages is preferably 0 Torr/hour to 175 Torr/hour. In an overall view of the entire decompression process, an average decompression rate of the semi-finished product ranges from 75 Torr/hour to 125 Torr/hour.

In step S4, a sample is taken from the chemical reactor to measure its acid value. When the acid value of the sample is less than 1 mg KOH/g, the chemical reactor is fully decompressed and vacuumed, for example, but is not limited to causing the pressure in the chemical reactor to be lower than 50 Torr. A sample is also taken from the chemical reactor to measure the viscosity of the plasticizer. When the viscosity of the plasticizer is between 200 cps and 10000 cps, the reaction is terminated and the vacuum is stopped, and the temperature is lowered to 40° C. for unloading. After cooling, the plasticizer of the present disclosure can then be obtained. More preferably, the reaction ends when the viscosity of the plasticizer is between 1500 cps and 3500 cps.

Experimental Testing

In order to verify the effects of the heating process and the decompression process of the present disclosure, examples 1 to 9 are operated according to the abovementioned steps S1 to S4. In addition, ingredients of the raw material mixtures in examples 1 to 9 are listed in Table 1. Furthermore, in order to facilitate a comparison of the molar ratios of acids and alcohols in the raw material mixture, the added grams of dicarboxylic acids, diols, and monohydric alcohols in Table 1 are converted into molars and listed in Table 2. It can be seen from Table 2 that a molar ratio of the dibasic acid to the diol to the monohydric alcohol is 1:0.83 to 0.99:0.32 to 0.47.

TABLE 1

| | Raw material mixtures (g) | | | | | |
| | Di-carboxylic acid | Diol | | Monohydric alcohol | | Catalyst |
| Examples | Adipic acid | Neo-pentyl glycol | 2-methyl-1,3-propanediol | 2-ethyl-hexanol | 2-propyl-heptanol | Titanium catalyst |
| --- | --- | --- | --- | --- | --- | --- |
| 1 | 800 | 332 | 165 | 310 | 0 | 0.51 |
| 2 | 765 | 317 | 158 | 296 | 0 | 0.51 |
| 3 | 900 | 374 | 186 | 349 | 0 | 0.51 |
| 4 | 1000 | 415 | 206 | 388 | 0 | 0.51 |
| 5 | 800 | 325 | 161 | 324 | 0 | 0.51 |
| 6 | 800 | 314 | 163 | 240 | 0 | 0.51 |
| 7 | 1000 | 402 | 200 | 441 | 0 | 0.51 |
| 8 | 1000 | 402 | 200 | 0 | 400 | 0.51 |
| 9 | 1000 | 300 | 260 | 0 | 250 | 0.51 |

TABLE 2

| | Raw material mixtures (mole) | | | | |
| | Dicarboxylic acid | Diol | | Monohydric alcohol | |
| Examples | Adipic acid | Neopentyl glycol | 2-methyl-1,3-propanediol | 2-ethylhexanol | 2-propylheptanol |
| --- | --- | --- | --- | --- | --- |
| 1 | 5.48 | 3.19 | 1.83 | 2.38 | 0 |
| 2 | 5.24 | 3.05 | 1.75 | 2.27 | 0 |
| 3 | 6.16 | 3.60 | 2.06 | 2.68 | 0 |
| 4 | 6.85 | 3.99 | 2.29 | 2.98 | 0 |
| 5 | 5.48 | 3.13 | 1.79 | 2.49 | 0 |
| 6 | 5.48 | 3.02 | 1.81 | 1.84 | 0 |
| 7 | 6.85 | 3.87 | 2.22 | 3.39 | 0 |
| 8 | 6.85 | 3.87 | 2.22 | 0 | 2.53 |
| 9 | 6.85 | 2.88 | 2.89 | 0 | 1.58 |

Figure 2:
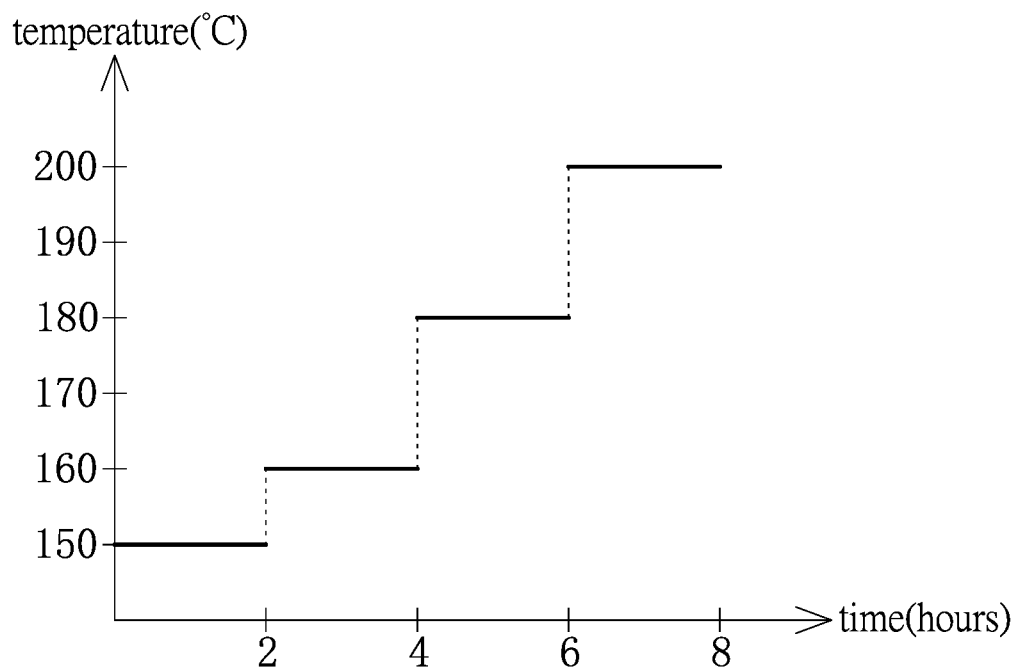
FIG. 2 is a schematic view of a change in a temperature of a chemical reactor with respect to a time in a heating process according to one embodiment of the present disclosure.

In examples 1 to 9, the temperature range in the heating process is between 150° C. and 200° C. A schematic view of a change in temperature of a chemical reactor with respect to time is shown in FIG. 2. The predetermined temperature values are respectively 150° C., 160° C., 180° C., and 200° C. That is to say, the temperature range of 150° C. to 200° C. is divided into four temperature holding stages. In addition, the predetermined temperature values are arranged from low to high, the temperature of the first temperature holding stage is 150° C., the temperature of the second temperature holding stage is 160° C., the temperature of the third temperature holding stage is 180° C., and the temperature of the fourth temperature holding stages is 200° C. Moreover, a duration time of each of the temperature holding stages is 2 hours. A temperature rising rate of the first temperature holding stage, the second temperature holding stage, the third temperature holding stage, and the fourth temperature holding stage are respectively 5° C./hour, 10° C./hour, 10° C./hour, and 0° C./hour. Furthermore, an overall average temperature rising rate of the temperature heating process is 6.25° C./hour.

As seen in FIG. 2, the heating process of the present disclosure includes a plurality of discontinuous temperature holding stages. Therefore, in the heating process, the temperature of the chemical reactor with respect to time has a stepped pattern instead of having a pattern in a straight line or a smooth curve. Accordingly, temperature conditions of the environment can be avoided from changing rapidly, which causes reaction conditions of the reaction mixture to constantly change.

Figure 3:
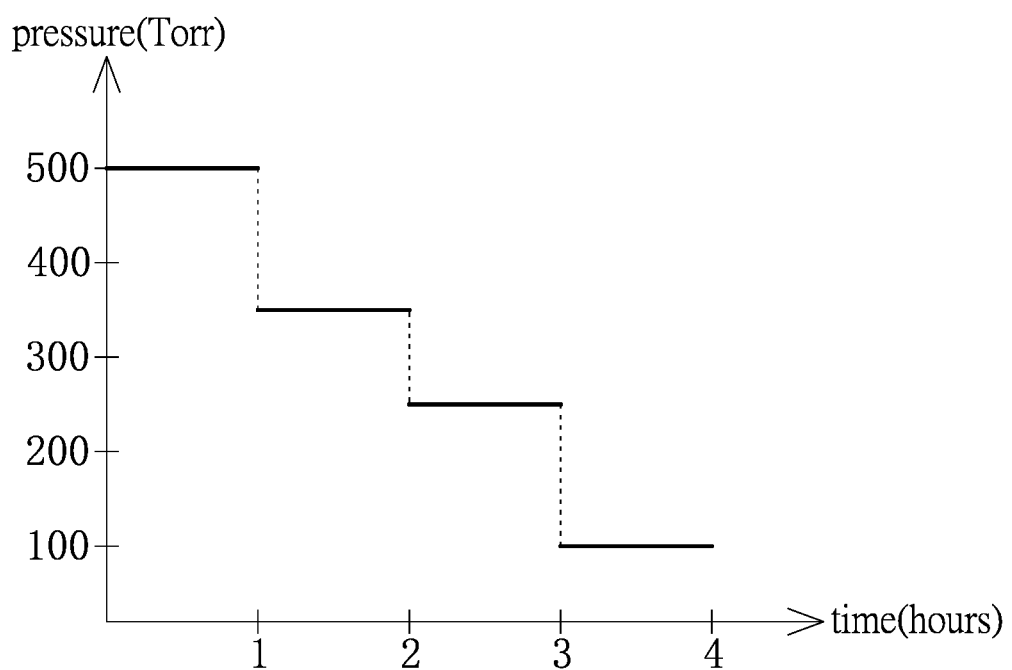
FIG. 3 is a schematic view of a change in a pressure of the chemical reactor with respect to a time in a decompression process according to one embodiment of the present disclosure.

In examples 1 to 9, the pressure range in the decompression process is between 500 Torr and 100 Torr. A schematic view of a change in pressure of a chemical reactor with respect to time is shown in FIG. 3. The predetermined pressure values are respectively 500 Torr, 350 Torr, 250 Torr, and 100 Torr. That is to say, the pressure range of 500 Torr to 100 Torr is divided into four low pressure stages. In addition, the predetermined pressure values are arranged from high to low, the pressure of the first low pressure stage is 500 Torr, the pressure of the second low pressure stage is 350 Torr, the pressure of the third low pressure stage is 250 Torr, and the pressure of the fourth low pressure stage is 100 Torr. Moreover, a duration time of each of the low pressure stages is 1 hour. A decompression rate of the first low pressure stage, the second low pressure stage, the third low pressure stage, and the fourth low pressure stage are respectively 150 Torr/hour, 100 Torr/hour, 150 Torr/hour, and 0 Torr/hour. Furthermore, an overall average decompression rate of the decompression process is 100 Torr/hour.

As seen in FIG. 3, the decompression process of the present disclosure includes a plurality of discontinuous low pressure stages. Therefore, in the decompression process, the pressure of the chemical reactor with respect to time has a stepped pattern instead of having a pattern in a straight line or a smooth curve.

After measurements are made, a weight average molecular weight (Mw), a number average molecular weight (Mn), a molecular weight distribution (Mw/Mn), and a viscosity and an acid value of the plasticizers of examples 1 to 4 are listed in Table 3. The viscosity and the acid value of the plasticizers prepared in examples 5 and 6 are also listed in Table 3.

TABLE 3

Characteristics of Plasticizers

| Examples | Mw (g/mol) | Mn (g/mol) | Mw/Mn | Viscosity (cps/ 25° C.) | Acid value (mgKOH/ g) | Alpha value of Hue |
|---|---|---|---|---|---|---|
| 1 | 2765 | 2126 | 1.301 | 2128 | 0.1 | 5 |
| 2 | 3147 | 2426 | 1.297 | 2565 | 0.22 | 15 |
| 3 | 3133 | 2408 | 1.301 | 2787 | 0.7 | 30 |
| 4 | 3457 | 2650 | 1.305 | 2971 | 0.41 | 45 |
| 5 | — | — | — | 2126 | 0.22 | 20 |
| 6 | — | — | — | 1820 | 0.6 | 40 |

According to the content in Table 3, the weight average molecular weight of the plasticizer of the present disclosure is 2500 to 3800, the number average molecular weight of the plasticizer is 2000 to 3000, and the viscosity of the plasticizer is 1500 cps to 3500 cps.

Moreover, according to the content in Table 3, it can be learned that the plasticizer of the present disclosure has a uniform molecular weight distribution with Mw/Mn being less than 1.35, and preferably Mw/Mn being less than 1.32. Therefore, the issue of low molecular weight polymers oozing out of the plasticizers in the processing program can be avoided. Furthermore, the alpha value of the hue of the plasticizer of the present disclosure is from 0 to 50.

Beneficial Effects of the Embodiment

In conclusion, one of the beneficial effects of the present disclosure is that, in the plasticizer and the method for producing the same, by virtue of "the reaction mixture containing the dibasic acid, the diol, the monohydric alcohol, and the catalyst", the aliphatic polyester plasticizer is produced to replace the phthalate plasticizers.

In addition, in the plasticizer and the method for producing the same provided by the present disclosure, by virtue of "heating stages in steps" and "decompression stages in steps", the molecular uniformity of the plasticizer can be enhanced and the content of the low molecular weight compounds in the plasticizer can be reduced.

Furthermore, in the plasticizer and the method for producing the same provided by the present disclosure, by virtue of "putting dibasic acid, diol, and catalyst into a chemical reactor, and then adding in monohydric alcohol during the heating process, so as to form the reaction mixture", the plasticizer can reduce the production of the low molecular weight compounds.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for producing a plasticizer, comprising:
    mixing a dibasic acid, a diol, and a catalyst to form a reaction mixture;
    adding a monohydric alcohol into the reaction mixture for a reaction and reacting the reaction mixture at each of a plurality of temperature holding stages in a heating process to form a semi-finished product; wherein a temperature range of the heating process ranges from 140° C. to 220° C.;
    when an acid value of the semi-finished product ranging from 15 mg KOH/g to 20 mg KOH/g, terminating the heating process;
    when an acid value of the semi-finished product ranging from 5 mg KOH/g to 10 mg KOH/g, purifying the semi-finished product at each of a plurality of low pressure stages of a decompression process to obtain the plasticizer, wherein a pressure range of the decompression process ranges from 750 Torr to 20 Torr; and when the viscosity of the plasticizer ranging between 1500 cps to 3500 cps, terminating the reaction and the decompression process for unloading;

wherein a molecular weight distribution with Mw/Mn of the plasticizer is less than 1.35, and a weight average molecular weight of the plasticizer ranges from 2500 g/mol to 3800 g/mol.

2. The method for producing the plasticizer according to claim 1, wherein the temperature holding stages are respectively a first temperature holding stage, a second temperature holding stage, a third temperature holding stage, and a fourth temperature holding stage, and wherein a temperature of the first temperature holding stage is from 140° C. to 155° C., a temperature of the second temperature holding stage is greater than 155° C. and up to 170° C., a temperature of the third temperature holding stage is greater than 170° C. and up to 190° C., and a temperature of the fourth holding stage is greater than 190° C. and up to 220° C.

3. The method for producing the plasticizer according to claim 2, wherein a duration time of each of the first temperature holding stage, the second temperature holding stage, the third temperature holding stage, and the fourth temperature holding stage is from 0.5 hours to 4 hours.

4. The method for producing the plasticizer according to claim 2, wherein the heating process of each of the temperature holding stages is completed at a temperature rising rate from 3° C./hour to 12° C./hour.

5. The method for producing the plasticizer according to claim 1, wherein an overall average temperature rising rate of the heating process is from 4° C./hour to 8° C./hour.

6. The method for producing the plasticizer according to claim 1, wherein the low pressure stages are respectively a first low pressure stage, a second low pressure stage, a third low pressure stage, and a fourth low pressure stage, and wherein a pressure of the first low pressure stage is from 750 Torr to 400 Torr, a pressure of the second low pressure stage is less than 400 Torr and as low as 300 Torr, a pressure of the third low pressure stage is less than 300 Torr and as low as 150 Torr, and a pressure of the fourth low pressure stage is less than 150 Torr and as low as 20 Torr.

7. The method for producing the plasticizer according to claim 6, wherein a duration time of each of the first low pressure stage, the second low pressure stage, the third low pressure stage, and the fourth low pressure stage is from 0.5 hours to 3 hours.

8. The method for producing the plasticizer according to claim 6, wherein the decompression process of each of the low pressure stages is completed at a decompression rate of from 75 Torr/hour to 175 Torr/hour.

9. The method for producing the plasticizer according to claim 1, wherein an overall average decompression rate of the decompression process is from 75 Torr/hour to 125 Torr/hour.

10. The method for producing the plasticizer according to claim 1, wherein in the reaction mixture, a molar ratio of the dibasic acid to the diol to the monohydric alcohol is 1:0.83-0.99:0.32-0.47.

* * * * *